(12) United States Patent
Livingston

(10) Patent No.: US 7,956,483 B2
(45) Date of Patent: Jun. 7, 2011

(54) SECONDARY POWER SOURCE FOR A LIGHT TRUCK VEHICLE

(76) Inventor: Stanley Edward Livingston, Campbellville (CA)

(*) Notice: Subject to any disclaimer, the term of this patent is extended or adjusted under 35 U.S.C. 154(b) by 463 days.

(21) Appl. No.: 12/147,919

(22) Filed: Jun. 27, 2008

(65) Prior Publication Data

US 2009/0001728 A1    Jan. 1, 2009

Related U.S. Application Data

(60) Provisional application No. 60/946,751, filed on Jun. 28, 2007.

(51) Int. Cl.
*F03D 9/00* (2006.01)

(52) U.S. Cl. .............................. 290/55; 290/1 A; 290/44

(58) Field of Classification Search ................. 416/1, 7; 60/398, 698; 415/3.1; 290/1 A, 43, 44, 54, 290/55
See application file for complete search history.

(56) References Cited

U.S. PATENT DOCUMENTS

| | | | | |
|---|---|---|---|---|
| 2,941,613 A * | 6/1960 | Di Perna | | 290/44 |
| 3,374,849 A * | 3/1968 | Redman | | 180/2.2 |
| 3,444,946 A * | 5/1969 | Waterbury | | 290/54 |
| 3,621,930 A * | 11/1971 | Dutchak | | 290/55 |
| 4,094,377 A | 6/1978 | Biggs | | |
| 4,242,628 A | 12/1980 | Mohan et al. | | |
| 4,254,843 A * | 3/1981 | Han et al. | | 290/55 |
| 4,314,160 A | 2/1982 | Boodman et al. | | |
| 4,424,452 A | 1/1984 | Francis | | |
| 5,680,032 A | 10/1997 | Pena | | |
| 5,920,127 A | 7/1999 | Damron et al. | | |
| 5,986,429 A | 11/1999 | Mula, Jr. | | |
| 6,138,781 A * | 10/2000 | Hakala | | 180/165 |
| 6,373,145 B1 | 4/2002 | Hamrick | | |
| 6,700,215 B2 | 3/2004 | Wu | | |
| 6,815,840 B1 * | 11/2004 | Aldendeshe | | 290/1 R |
| 6,927,503 B2 | 8/2005 | Enis et al. | | |
| 7,067,937 B2 | 6/2006 | Enis et al. | | |
| 7,105,940 B2 | 9/2006 | Weesner et al. | | |
| 7,135,786 B1 | 11/2006 | Deets | | |
| 7,147,069 B2 | 12/2006 | Maberry | | |
| 7,468,562 B1 * | 12/2008 | Barbic | | 290/40 C |
| 7,547,983 B2 * | 6/2009 | Sabella | | 290/40 C |
| 2002/0153178 A1 | 10/2002 | Limonius | | |
| 2003/0057708 A1 | 3/2003 | Wu | | |
| 2003/0132638 A1 | 7/2003 | Simonsen | | |
| 2003/0155464 A1 | 8/2003 | Tseng | | |
| 2005/0046195 A1 | 3/2005 | Kousoulis | | |
| 2005/0098361 A1 | 5/2005 | Mitchell | | |
| 2005/0103537 A1 | 5/2005 | Michaud et al. | | |
| 2005/0121242 A1 | 6/2005 | Robinson | | |

(Continued)

FOREIGN PATENT DOCUMENTS

DE    3139165    10/1981

(Continued)

*Primary Examiner* — Tho D Ta
(74) *Attorney, Agent, or Firm* — Borden Ladner Gervais LLP; Jeffrey W. Wong

(57) ABSTRACT

The invention is directed at an air flow apparatus for use with an electric vehicle. The air flow apparatus operates as complementary energy sources for the production of electricity to maintain battery capacity for the propulsion of an electrically powered vehicle. This is preferably achieved by combining induced air flow and the burning of a fossil fuel, such as propane, to effect generator output. In another embodiment, the use of propane is reduced as the vehicle proceeds at specific speeds.

4 Claims, 4 Drawing Sheets

U.S. PATENT DOCUMENTS

| | | |
|---|---|---|
| 2005/0218657 A1* | 10/2005 | Weesner et al. .................. 290/55 |
| 2006/0213697 A1 | 9/2006 | Sutherland |
| 2006/0278445 A1 | 12/2006 | Chang |
| 2007/0013192 A1* | 1/2007 | Berkson .......................... 290/43 |
| 2008/0296907 A1* | 12/2008 | Donahue ....................... 290/1 A |

FOREIGN PATENT DOCUMENTS

| | | |
|---|---|---|
| DE | 3500143 | 7/1986 |
| JP | 56060874 | 5/1981 |
| JP | 62225775 | 10/1987 |
| JP | 63095802 | 4/1988 |

* cited by examiner

SECONDARY POWER SOURCE FOR A LIGHT TRUCK VEHICLE

CROSS-REFERENCE TO RELATED APPLICATIONS

This application claims the benefit of U.S. Provisional Application No. 60/946,751, filed Jun. 28, 2007, which is incorporated herein by reference.

FIELD OF THE INVENTION

The present invention relates generally to electrically powered vehicles. More particularly, the present invention relates to a secondary power source for an electrically powered vehicle, such as a light truck or SUV.

BACKGROUND OF THE INVENTION

The lure of producing an electrically powered vehicle has become pervasive and is being pursued on a wide variety of fronts. One such example is the ELIICA, or Electric Lithium-Ion Car. The ELIICA is a battery powered vehicle which provides a vehicle having improved power, speed and quietness of ride within the capacity of its batteries. In this respect, the powering of vehicles in the light truck category has been held back by the short driving range available to these vehicles through battery power alone.

In addition to the commercial advantages of all electric vehicles, the use of electrical powering also provides environmental advantages. Idling during stops is eliminated and the volume of overall exhaust fumes is substantially reduced during normal operations. However, as battery capacity is easily compromised when used as the sole power source, there is a need for a secondary energy source.

Therefore, there is provided a secondary power source for an electrically powered vehicle in the light truck category.

SUMMARY OF THE INVENTION

The invention is directed at a secondary power source, seen as an air flow apparatus, for an electrically powered vehicle in the light truck category. Examples of light truck vehicles include, but are not limited to, cargo vans, passenger vans, Hummers and Sport Utility Vehicles (SUVs). In one embodiment, through the use of continuous air flow, bolstered by accompanying generators, the invention provides for the ability to maintain battery capacity for operation of its associated light truck vehicle.

Use of the air flow apparatus is desirous for a multitude of goals, including, but not limited to, maintaining battery capacity at, or near, its optimum charge while the light truck is in use. This is preferably achieved by fossil fuel burn and/or induced air flow as the vehicle proceeds at speed.

The use of a fossil fuel, such as propane, allows this hybrid apparatus to operate with a very light environmental footprint. When the vehicle is moving at low speeds and/or experiencing low battery capacity, propane burn can be used to maintain that flow of air necessary for efficient electrical generation.

Propane burn is therefore complimentary to the induced air flow which allows for reliable, continuous, generator operation but with an intermittent need for fossil fuel consumption.

The secondary power source, or air flow apparatus, takes advantage of the induced airflow experienced by the light truck vehicle when it is in motion. By generating a continuous source of electrical power while the vehicle is in motion and/or at rest through the air flow apparatus, battery based electrical powering extends the driving range of vehicles in the light truck category.

Furthermore, the invention lends itself to the conversion of aftermarket vehicles (at relatively low cost), from internal combustion engine powering, as well as contributing to the reduction in cost of new manufactured vehicles.

In another aspect of the invention, there is provided an energy producing unit for an electrically powered vehicle comprising at least one air flow unit; a fossil fuel source connected to the at least one air flow unit; and a controller, in communication with the at least one air flow unit and the fossil fuel source.

BRIEF DESCRIPTION OF THE DRAWINGS

Embodiments of the present invention will now be described, by way of example only, with reference to the attached Figures, wherein.

DETAILED DESCRIPTION

The invention is directed at a secondary power source for an electrically powered vehicle. The secondary power source, or air flow apparatus, provides an energy source for continuously powering a battery within an electrically powered vehicle. Therefore, the battery does not have to be recharged after each trip that the vehicle makes. This also allows for less down time where by the battery has to be charged before it can be used again. With the addition of the secondary power source, battery capacity level can be maintained while the vehicle is in motion.

The airflow power units are designed to operate as complimentary, or secondary, energy sources for the production of electricity to maintain battery capacity for the propulsion of the electrically powered vehicle. As the primary energy source is fossil fuel, the airflow power units operate through a combination of fossil fuel burn (i.e. propane) and/or inducted air flow created by the motion of the vehicle.

Figure 1A:
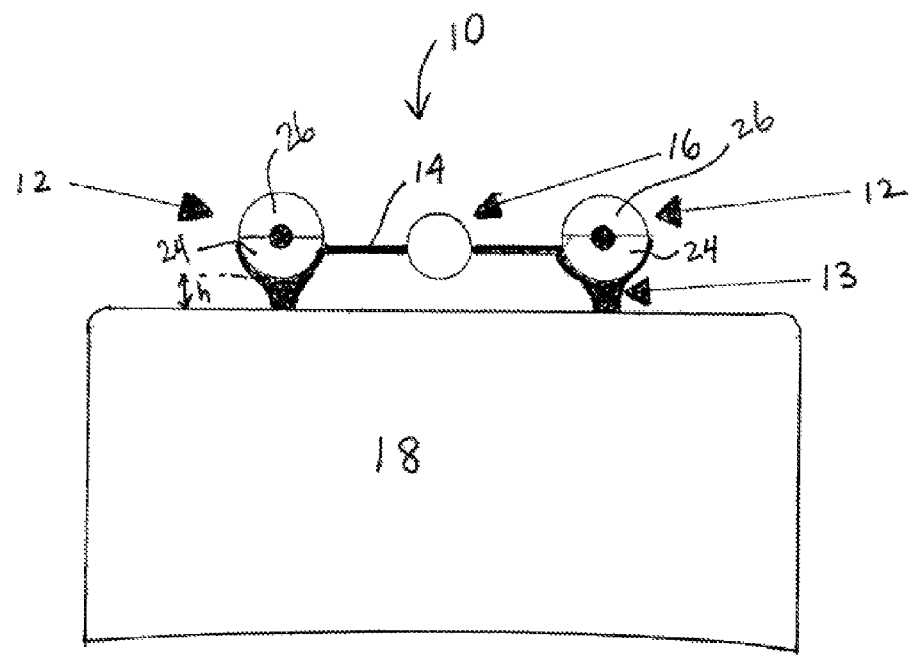
FIG. 1a is a schematic front view of a secondary power source for a vehicle in the light truck category.
Figure 1B:
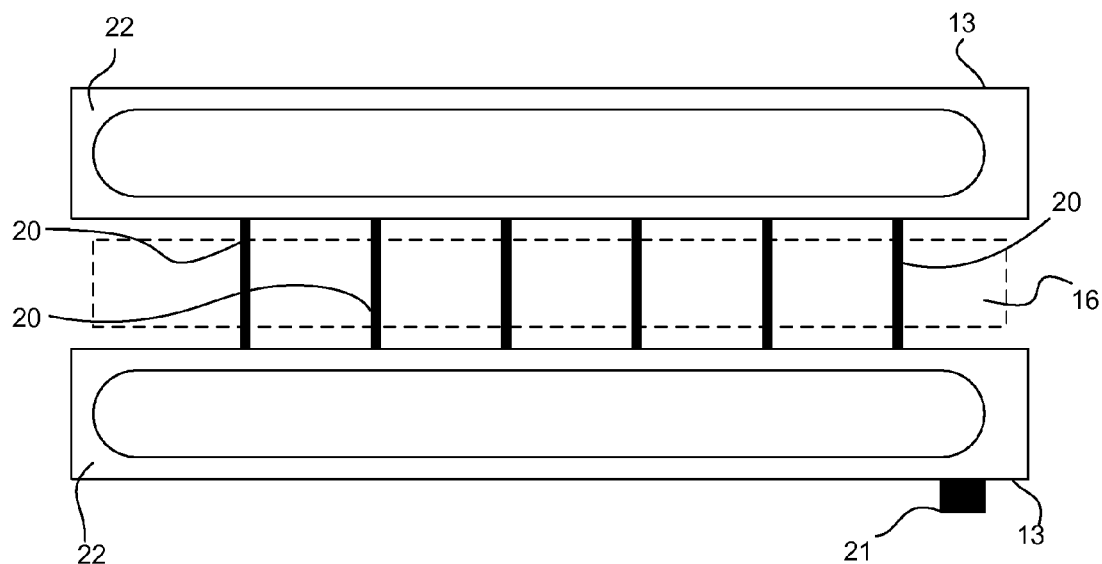
FIG. 1b is a schematic top view of the secondary power source.

Turning to FIGS. 1a and 1b, schematic front and top views of a secondary power source is shown. The secondary power source, or energy producing unit 10 includes a pair of airflow power units 12 located upon a pair of individual cambered pedestals 13 within a support rack 14. A tank 16 of fossil fuel, such as propane, is also supported and held in place by the rack 14. As will be understood, the tank 16 can contain other fossil fuels such as, but not limited to, natural gas. In the current embodiment, the support rack 14 is aligned with, and secured to, the roof of a light truck vehicle, such as a cargo van. The rack 14 supports at least two air flow units 12, each having an overall length of 150 cm in the preferred embodiment.

In the preferred embodiment, the airflow units 12 rest on the cambered pedestals 13 and are located at a height (h) above the roof line, where h is at least fifteen cm. The pair of cambered pedestals 13 include support, such as bedding, for the units 12 so that there is little movement of the units 12 while the vehicle, or light truck, is in motion. The bedding is preferably made from sound and vibration absorbing material to minimize the transmission of such to the vehicle.

The support rack 14 further includes a plurality of cross stringers 20 which support the propane tank 16 (shown in dotted lines in FIG. 1b). The cross stringers 20 are shaped to reduce the air resistance experienced the rack 14 while the vehicle is in motion. Within the hollow cross stringers 20 is tubing and/or piping to house wiring for operation of various electronic controls and to transport propane from the propane tank to the air flow units 12. In one embodiment, a filler port 21 is built into one of the pedestals 13 and connected with the internal tubing in one of the cross-stringers 20. The other end of the tubing is in fluid communication with the tank 16. This allows the propane tank 16 to be refilled without having to remove it from the support rack 14. In the preferred embodiment, the filler port 21 is in line with one of the cross stringers 20 and crosses under the airflow power unit 12.

The camber 22 of each pedestal 13 is designed to receive one of the airflow power units 12 and to fully support the length of the airflow units 12.

Each of the airflow power units 12 includes a core unit (described and shown in FIG. 2) which is encased by a two-piece casement. The core unit includes a lower steel half shell 24 which is securely affixed to its respective pedestal 13 and an upper half shell 26. The two half shells 24 and 26 are hinged together on their outer edges via a lockable hinge apparatus, such as locking lugs. In one embodiment, the locking lugs are preferably mounted on an inner surface of the casement to secure the breach of the air flow unit 12. This also allows for an ease of servicing or replacement of the air power units 12 while also providing improved security against theft. The lower half shell 24 includes a slot (not shown) which receives a control cylinder (which is described below). Additionally, the inner surface of each half shell 24 or 26 includes sound and vibration absorbing material to provide bedding for each air flow unit 12.

The propane tank 16 is mounted on the support rack 14 with its filling port in close proximity to the filler port 21 and preferably near the rear of the vehicle. As such the feed lines for supplying propane to the units 12 are brought forward within the cross-stringers 20 and the pedestals 13 with a second end of each feed line connected to a T-valve set under one of the cross stringers 20 closer to the front of the vehicle. Another feed line, metered to provide a set, constant burn pattern, extends from this valve to the burner heads, or igniters, of the power unit 12. The T-valve can also be automatically and/or manually controlled to shut off propane supply to the power units 12 for safety reasons.

Figure 2:
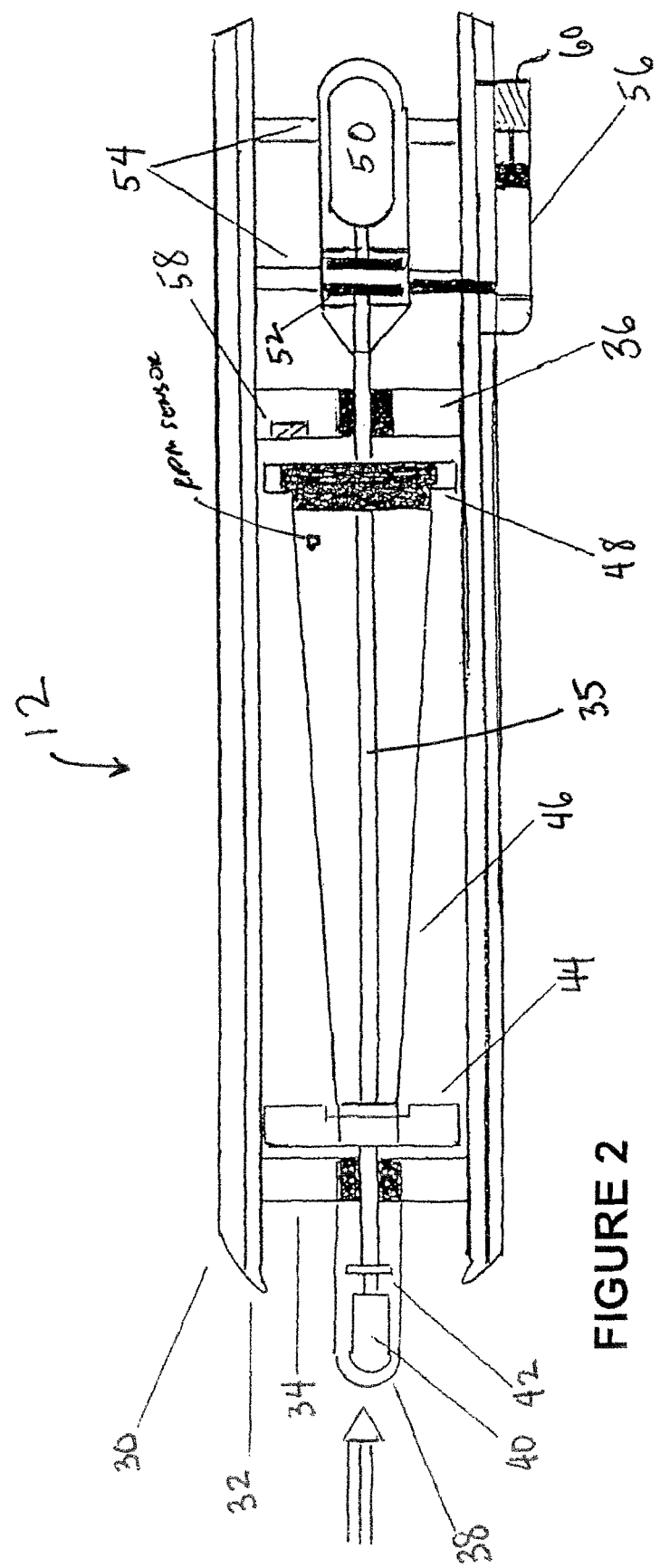
FIG. 2 is a side view of an airflow power unit.

Turning to FIG. 2, a cross-sectional side view of an airflow power unit 12 is shown. The unit 12 includes the two-piece casement, seen as an outer casing 30, which encases a power tube cylinder 32 having a front shaft support 34 and a rear shaft support 36. Located on a surface of the front shaft support 34 is a fixed nose cone 38 having an electric starter, or booster, motor 40 and a clutch 42. Between the front shaft support 34 and the rear shaft support 36 is an impeller 44, a rotating cone 46 and a turbine 48. As shown, a shaft 35 extends through the front support 34, the impeller 44, the cone 46, the turbine 48 and the rear support 36 and terminates at a hydraulic driver impeller located within a hydraulic transmission housing 52. A generator 50 and the housing 52 is supported by generator housing supports 54 which are also attached to an inner surface of the outer casing 30 to provide the necessary support. A transmission control cylinder 56 is located within the slot in the lower shell but is in operational communication with the generator 50 to supply and remove transmission fluid from the transmission housing. The transmission control cylinder 56 allows all rotating parts to continue to operate freely, independent of the generator drag during periods of traffic delay or short stops to maintain a continuous flow of air through the power unit 12. In periods of inclement weather, this assist in reducing the amount of accumulation of snow or rain.

In the present embodiment, a temperature sensor, or monitor, 58 is located within the rear support 36 but as will be understood, the monitor 58 can be located at any position within unit 12. If an excess temperature is recorded at any time, an alert message is transmitted.

In operation, as the vehicle slows down, this allows transmission fluid to flow away from the transmission housing while still having the impeller 44 and turbine 48 rotate since the shaft 35 is not connected to the generator 50. This will be described in more detail below.

In the preferred embodiment, the front shaft support 34 is shaped to reduce the resistance of the incoming, or induced, airflow and to provide support to the shaft 35. The nose cone 38 provides anchor points for the electric starter motor 40 as well as protection from environmental elements. The starter motor 40 is controlled and powered by a central processing unit (not shown) via wiring which is threaded through the pedestal 13 and other parts of the support rack 14 and unit 12. The motor 40 also operates as an automotive starter to boost shaft speed to a minimum of 1500 revolutions per minute (RPM).

The clutch 42 is used to monitor shaft rotation to ensure that the shaft 35 rotates at a desired, or predetermined RPM. In one embodiment, the clutch 42 is a two disc system whereby a starter disc engages on a shaft disc before disengaging when the desired RPM has been attained. The impeller 44 revolves around with the rotation of the shaft 35 when it is powered by the motor 40 or driven by the induced airflow within the power unit 12. In the preferred embodiment, the impeller 44 is a four bladed type propeller but other types of impellers are contemplated.

The rotating, or compressor cone, 46 is connected at one end to the impeller 44 and at its other end to the turbine 48. The cone 46 reduces the intake diameter of the unit 12 creating a Venturi effect in respect of the incoming airflow thereby increasing the flow-through over the blades of the turbine 48. The cone 46 preferably includes a number of raised surface spines to provide a more direct impact on the airflow within the unit 12.

The turbine 48, preferably at 15 lbs weight, is designed to maintain shaft rotation while the vehicle experiences a short loss of induced airflow, such as when the vehicle is at a traffic light, stopped or in traffic.

The generator housing supports 54 are similar in design to the front supports 34 but include a drainage tube which allows for the flow of transmission fluid from and into a storage cylinder from the housing. The transmission unit 52 is a casing which encloses hydraulic fluid, the power impeller and the generator drive impeller and assists in controlling when the vehicle is operating under normal conditions (drive) or via induced air flow (air).

The temperature sensor 58 is used to alert the CPU to shut down the feed of propane when an overheating condition arises. Once the temperature sensor 58 senses this emergency condition, a warning signal is transmitted to the CPU or controller which signals this to the driver of the vehicle. The vehicle should then be stopped so that the back-up T-valve can be manually shut off. In an alternative embodiment, once the emergency condition is sensed, the T-valve is automatically shut off.

The transmission control cylinder 56 includes a piston 60. When the piston 60 is retracted by the control motor 40, transmission fluid drains from the transmission housing 52 into the cylinder 56. Depending on signals transmitted by the CPU, the piston 60 cycles so that the generator drive can range from constant, to pulse, to nothing.

Figure 3:
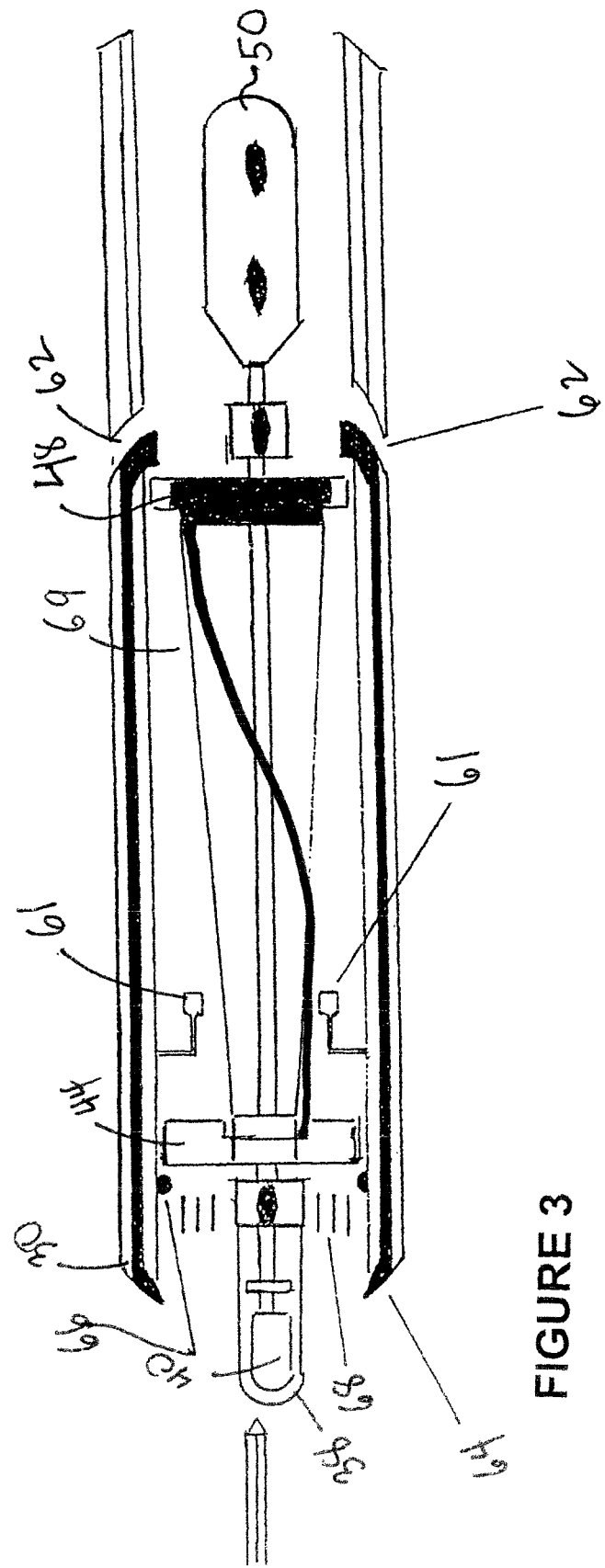
FIG. 3 is a top view of an airflow power unit.

FIG. 3 provides a cross-sectional top view of the airflow power unit. As shown, the power unit 12 includes a pair of propane igniters 61 which assist in powering the apparatus 12. A pair of side vents 62 allowing the air to flow through are located near a rear of the power unit 12. A warm air return piping 64 and a plenum heater ring 66 are located near a front of the unit 12. Near the heater ring 66 is a set of plenum drainage slits 68.

Figure 4:
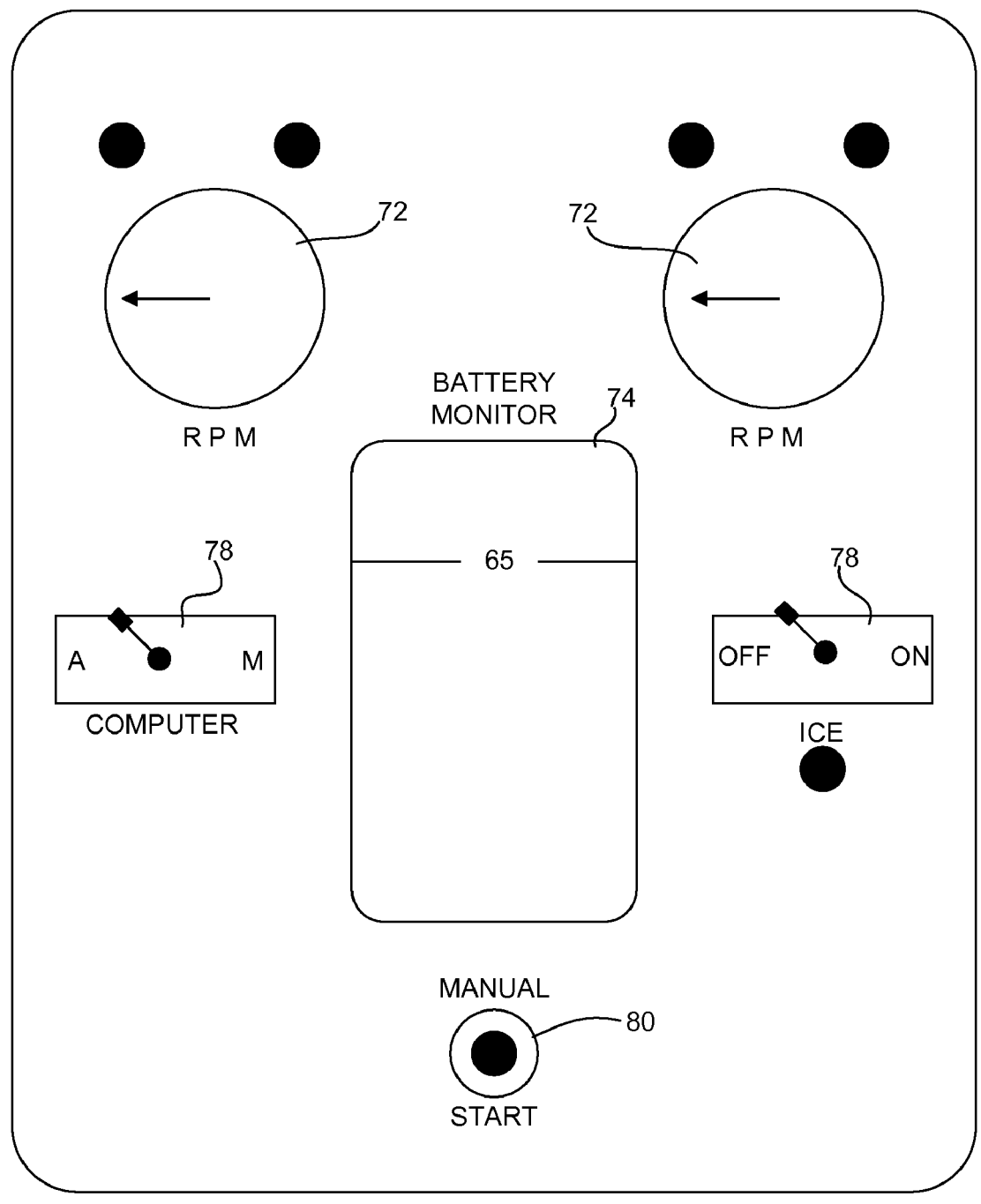
FIG. 4 is a schematic diagram of a control panel.

As propane flows from the propane tank 16 to the power unit 12, the flow of propane is controlled by a user using the computer control panel (FIG. 4). Through user action, the computer control panel transmits signals to valves within the feed line to regulate the propane flow. Ignition of the propane is preferably via a set of glow plugs built into each burner head of the propane igniters 61. In the preferred embodiment, the temperature sensor 58 is wired into the computer control panel so that an overheating, or emergency, condition (due to reduced or blocked airflow) in either of the power units 12 causes the propane flow to be immediately shut off and/or a warning signal transmitted.

The side vents 62 allow ambient air to mix with the induced airflow within the unit 12 so that exhaust temperatures can be reduced while the vehicle is in motion. This temperature reduction also assists in reducing and/or preventing the chance of exhaust rumble.

The warm air return piping 64 include collector cups which are situated aft from the turbine 48 in order to trap and/or catch the warmed air exiting from the main body of the airflow power unit 12. The piping 64 on each side of the turbine 48 conveys the warmed air to the intake plenum 68 in order to release it from the unit 12. The consistent flow of warmed air assists in keeping the unit's impeller 44 clear of ice or snow build-up during periods of inclement weather.

The plenum heater ring 66 encircles the interior of the intake plenum 68 and provides further assistance to vehicle start up when the vehicle has been subject to periods of adverse weather conditions while at rest. The drainage slits 68 are used to reduce/prevent the accumulation of excess precipitation on the unit 12.

Turning to FIG. 4, a schematic diagram of a computer control panel is shown. The computer control panel 70 is used to control a CPU which is used to control the unit 10 and includes, but is not limited to, a pair of RPM monitors 72 (each associated with one of the air flow units 12), a battery monitor 74, a computer 76, an ice control 78 and a manual start button 80. The computer 76 allows the vehicle to operate in an automatic mode or a manual mode.

In the automatic mode, the computer comes online when the ignition is activated. When in automatic mode and the vehicle is energized, an LED indicates that the computer is online and operational. The rotation or spin of the power unit 12 can then be initiated by either burning of the fossil fuel or by induced airflow. The RPM indicators 72 (reflecting the rotation of the individual units 12) can be monitored to ensure that they are balanced during operation of the vehicle.

If an emergency condition arises (such as an overheating condition), an emergency indicator can be provided by the computer control panel 70. If this emergency condition occurs when the vehicle is operating under normal drive condition, the computer immediately shuts off the propane supply to the affected power unit 12 valve. The driver should back up this action by stopping and closing off the T-valve as a secondary safety measure ensuring all propane flow is stopped. The vehicle can then continue to operate using the battery and the remaining air flow unit 12.

When driving in inclement weather, whereby air flow can be restricted or reduced, the vehicle can operate in drive conditions and the ice control can be activated so that the vehicle maintains a positive, and constant, RPM.

In manual mode for the computer, it bypasses the ignition (part of wiring required to connect the unit 10 with a vehicle) so that the vehicle can be left charging while properly secured. The computer is powered by the battery of the vehicle thereby allowing the vehicle to be locked down while keeping the power units 12 operational. In this mode, the battery of the vehicle can be charged when the vehicle is parked by initiating propane burn until the battery is fully charged. This button is connected to the valves/starter motor such that when the button is pressed, a signal is transmitted to the valve to open so that the air flow units can operate in a power mode by igniting the igniters using the propane. After the battery is fully charged, a signal is transmitted to the controller and the valve closed to shut down the propane supply.

In operation, assuming that the battery of the vehicle is fully charged, the CPU turns on when the vehicle is initially energized. Once the vehicle starts to move, air flow is induced into the air flow units 12. This induced air flow causes the impeller 44 and turbine 48 to rotate as the vehicle moves. The RPM of the turbine 48 is monitored by a sensor (not shown) and displayed on the control panel 70. Once the RPM of the turbine 48 reaches a predetermined value, or criteria, the CPU transmits a signal to the transmission control cylinder 56 which releases transmission fluid into the transmission unit 52 enabling the generator 50 to produce electrical power thereby allowing the vehicle to operate while conserving battery power. As will be understood, wiring between the generator 50 and the battery is required in order to synchronize the units and so that the vehicle operates using the secondary power source and not the battery.

When the generator 50 is providing the power to operate the vehicle and the vehicle is stopping or slowing down, the piston 60 retracts to release the transmission fluid from the transmission housing which allows the impeller 44 to rotate without drag. As the vehicle starts up again, the impeller 44 and turbine 48 rotate due to induced air flow and the generator 50 is again supplied with transmission fluid once the predetermined RPM level has been reached as described.

When the battery level is less than a desirable level, such as 65% capacity, and the CPU is set to automatic, when the vehicle is energized, the CPU activates the starter motor 40 to spin up the air flow units 12 to approximately 1500 RPM at which point it will open the propane valves 61 and ignite propane burn. In this manner, the air flow units 12 are manually started so that the desired RPM can be reached without having to move the vehicle. If the vehicle is in motion, the vehicle operates as described above with respect to the automatic mode. Once reached, the transmission fluid is provided to the generator and the generator proceeds to produce electrical power. Propane burn continues until the battery has been brought to full capacity by the generator(s) or until induced air flow is sufficient (determined by speed and rpm inputs to the CPU) to allow propane burn to shut down while induced air flow continues the charging scenario.

In an alternative embodiment, the air flow apparatus is designed to be simple, rugged and easy to maintain and makes use of off-the-shelf components such as electrical starter motors, propane canisters, burner heads, and plastic piping. As such, its retail cost, either for conversion of existing vehicles, or for original vehicle manufacture keeps the equipment within a pricing range that is compatible with public acceptance.

The above description and accompanying drawings are presented to enable any person skilled in the art to make use of the invention and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. The appended claims, properly construed, form the only limitation upon the scope of the invention.

What is claimed is:

1. An energy producing unit for an electrically powered vehicle comprising:
   at least one air flow unit;
   a fossil fuel source connected to the at least one air flow unit; and
   a controller, in communication with the at least one air flow unit and the fossil fuel source;
   wherein the at least one air flow unit comprises:
   an impeller;
   a turbine;
   a transmission housing;
   a shaft connecting the impeller, the turbine and the transmission housing;
   a generator connected to the shaft, located adjacent the transmission housing;
   a revolutions per minute (RPM) sensor for measuring the RPM of the at least one air flow unit;
   wherein when the RPM level reaches a predetermined level, the generator starts to operate to provide power to the vehicle.

2. The energy producing unit of claim 1 the air flow unit is stored in a two-piece casement.

3. The energy producing unit of claim 1 further comprising a heat sensor for monitoring emergency conditions.

4. The energy producing unit of claim 1 wherein the air flow unit further comprises:
   a starter motor for manually starting the impeller; and
   a set of igniters, connected to the fossil fuel source, to provide ignition to the air flow unit.

* * * * *